US011755268B2

(12) United States Patent
Egami (10) Patent No.: US 11,755,268 B2
(45) Date of Patent: Sep. 12, 2023

(54) PRINTER PERFORMS REGISTRATION PROCESS OF SELECTED SHEET TYPE CORRESPONDING TO AUTHENTICATED USER AND TO FURTHER DISPLAY A LIST OF AT LEAST SHEET TYPES THEREON SUPPORTED BY THE PRINTER

(71) Applicant: KYOCERA Document Solutions Inc., Osaka (JP)

(72) Inventor: Ryo Egami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/744,406

(22) Filed: May 13, 2022

(65) Prior Publication Data

US 2022/0365734 A1 Nov. 17, 2022

(30) Foreign Application Priority Data

May 14, 2021 (JP) ................................ 2021-082624

(51) Int. Cl.
*G06F 3/12* (2006.01)
*H04N 1/00* (2006.01)
*G03G 15/00* (2006.01)

(52) U.S. Cl.
CPC .......... *G06F 3/1257* (2013.01); *G06F 3/1204* (2013.01); *G06F 3/1238* (2013.01); *G06F 3/1255* (2013.01); *G03G 15/607* (2013.01); *G03G 2215/00383* (2013.01); *G03G 2215/00751* (2013.01); *H04N 1/00681* (2013.01)

(58) Field of Classification Search
None
See application file for complete search history.

(56) References Cited

U.S. PATENT DOCUMENTS

| 8,711,382 B2* | 4/2014 | Yamamoto | G06F 21/608 358/1.14 |
| 2008/0204681 A1* | 8/2008 | Murakami | B41J 11/009 355/77 |
| 2010/0245899 A1* | 9/2010 | Hirama | G06F 3/1284 358/1.15 |

(Continued)

FOREIGN PATENT DOCUMENTS

JP 2005-341215 A 12/2005

*Primary Examiner* — Haris Sabah
(74) *Attorney, Agent, or Firm* — Studebaker & Brackett PC (57) ABSTRACT

An image forming apparatus includes an image forming section, sheet type list storage, an authentication section, a display controller, and a display section. The image forming section forms a data image on a sheet. The sheet type list storage stores user sheet type lists therein on a user-by-user basis. The user sheet type lists each include one or more sheet types extracted from among sheet types included in a sheet type list. The sheet types are sheet types that the image forming section is capable of coping with. An authentication section authenticates a user. The display controller generates a sheet type selection screen based on a user sheet type list corresponding to the user authenticated by the authentication section among the user sheet type lists stored in the sheet type list storage. The display section displays the sheet type selection screen generated by the display controller.

6 Claims, 7 Drawing Sheets

(56) References Cited

U.S. PATENT DOCUMENTS

| | | | |
|---|---|---|---|
| 2014/0376028 A1* | 12/2014 | Tsujita | G06K 15/406 358/1.14 |
| 2016/0062713 A1* | 3/2016 | Oshima | G06F 3/1238 358/1.14 |
| 2019/0297211 A1* | 9/2019 | Tanaka | H04N 1/00708 |

* cited by examiner

PRINTER PERFORMS REGISTRATION PROCESS OF SELECTED SHEET TYPE CORRESPONDING TO AUTHENTICATED USER AND TO FURTHER DISPLAY A LIST OF AT LEAST SHEET TYPES THEREON SUPPORTED BY THE PRINTER

INCORPORATION BY REFERENCE

The present application claims priority under 35 U.S.C. § 119 to Japanese Patent Application No. 2021-082624, filed on May 14, 2021. The contents of this application are incorporated herein by reference in their entirety.

BACKGROUND

The present disclosure relates to an image forming apparatus.

A printing management device causes display of a list of sheet sizes and sheet types supported by a printer as options in printing sheet setting.

SUMMARY

An image forming apparatus according to an aspect of the present disclosure includes an image forming section, sheet type list storage, an authentication section, a display controller, and a display section. The image forming section forms a data image on a sheet. The sheet type list storage stores user sheet type lists therein on a user-by-user basis. The user sheet type lists each include one or more sheet types extracted from among sheet types included in a sheet type list. The sheet types are sheet types that the image forming section is capable of coping with. The authentication section authenticates a user. The display controller generates a sheet type selection screen based on a user sheet type list corresponding to the user authenticated by the authentication section among the user sheet type lists stored in the sheet type list storage. The display section displays the sheet type selection screen generated by the display controller.

DETAILED DESCRIPTION

The following describes an embodiment of the present disclosure with reference to the accompanying drawings. Note that elements that are the same or equivalent are indicated by the same reference signs in the drawings and description thereof is not repeated.

Figure 1:
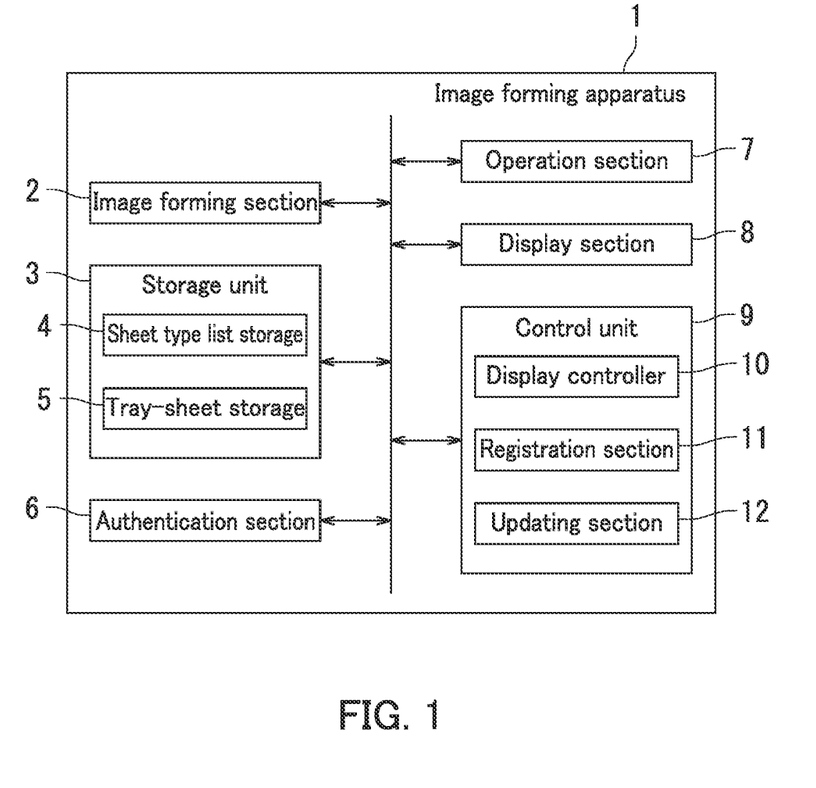
FIG. 1 is a block diagram of the configuration of an image forming apparatus according to an embodiment.

With reference to FIGS. 1 to 7, an image forming apparatus 1 according to the present embodiment will be described below. FIG. 1 is a block diagram of a configuration of the image forming apparatus 1 according to the present embodiment. The image forming apparatus 1 includes an image forming section 2, storage unit 3, an authentication section 6, an operation section 7, a display section 8, and a control unit 9. Note that the image forming apparatus 1 is an apparatus having at least an image forming function performed by the image forming section 2. Alternatively, the image forming apparatus 1 may be a multi-function peripheral having a plurality of functions such as an image reading function, a faxing function, and an email function in addition to the image forming function.

Figure 2:
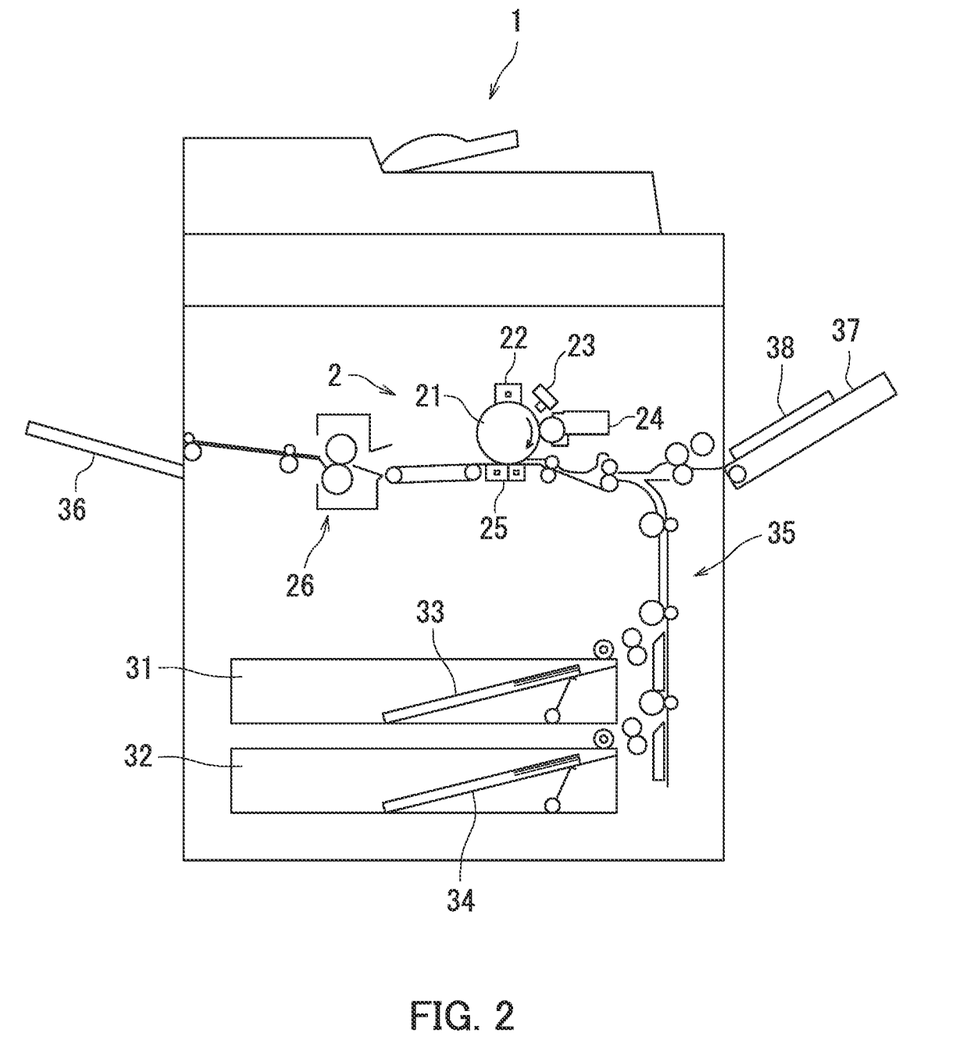
FIG. 2 is a schematically cross-sectional view of the image forming apparatus according to the embodiment.

FIG. 2 is a schematic cross-sectional view of the image forming apparatus 1 according to the present embodiment. The image forming apparatus 1 further includes a conveyance section 35, a first sheet feed tray 31, a second sheet feed tray 32, a manual sheet feed tray 37, and an exit tray 36. The conveyance section 35 conveys any of a sheet 33 loaded on the first sheet feed tray 31, a sheet 34 loaded on the second sheet feed tray 32, and a sheet 38 loaded on the manual sheet feed tray 37 to the image forming section 2 one at a time. The conveyance section 35 includes a belt and rollers.

The image forming section 2 includes a photosensitive drum 21, a charger 22, a light exposure section 23, a developing section 24, a transfer section 25, and a fixing section 26, and functions to form a data image on any of the sheet 33, sheet 34, and the sheet 38 conveyed to the image forming section 2. In a case in which the image forming apparatus 1 is a multifunction peripheral, image data representing an image (data image) to be formed on the sheet 33, 34, or 38 is for example image data acquired by reading a document using the image reading function or image data received from an external device (not illustrated) such as a personal computer.

The charger 22 charges the surface of the photosensitive drum 21. The light exposure section 23 irradiates the surface of the photosensitive drum 21 with light based on the image data. As a result, an electrostatic latent image corresponding to the image data is formed on the photosensitive drum 21. The developing section 24 attaches toner to the electrostatic latent image to form a toner image on the surface of the photosensitive drum 21. The transfer section 25 transfers the toner image to the sheet 33, 34, or 38. The fixing section 26 applies heat and pressure to the sheet 33, 34, or 38 to fix the toner image to the sheet 33, 34, or 38. Thereafter, the sheet 33, 34, or 38 is ejected out onto the exit tray 36.

The storage unit 3 in FIG. 1 is constituted by semiconductor memory such as random access memory (RAM) or a solid state drive (SSD), or magnetic memory such as a hard disk drive (HDD). The storage unit 3 includes sheet type list storage 4 and tray-sheet storage 5. The storage unit 3 includes a single memory area with storage region divided into a storage region for the sheet type list storage 4 and a storage region for the tray sheet storage 5. Alternatively, the storage unit 3 includes memory for the sheet type list storage 4 and memory for the tray-sheet storage 5.

The sheet type list storage 4 stores therein user sheet type lists on a user-by-user basis. Here, users are users authenticated by the authentication section 6. The user sheet type lists each are a list of a sheet type extracted from among sheet types included in a sheet type list. The sheet types are sheet types that the image forming section 2 is capable of coping with. The sheet type extracted from the sheet type list is changeable according to each user. The sheet type list storage 4 may store therein the sheet type list from which the sheet type in each user sheet type list is extracted, in addition to the user sheet type lists for the respective users.

Figure 3:
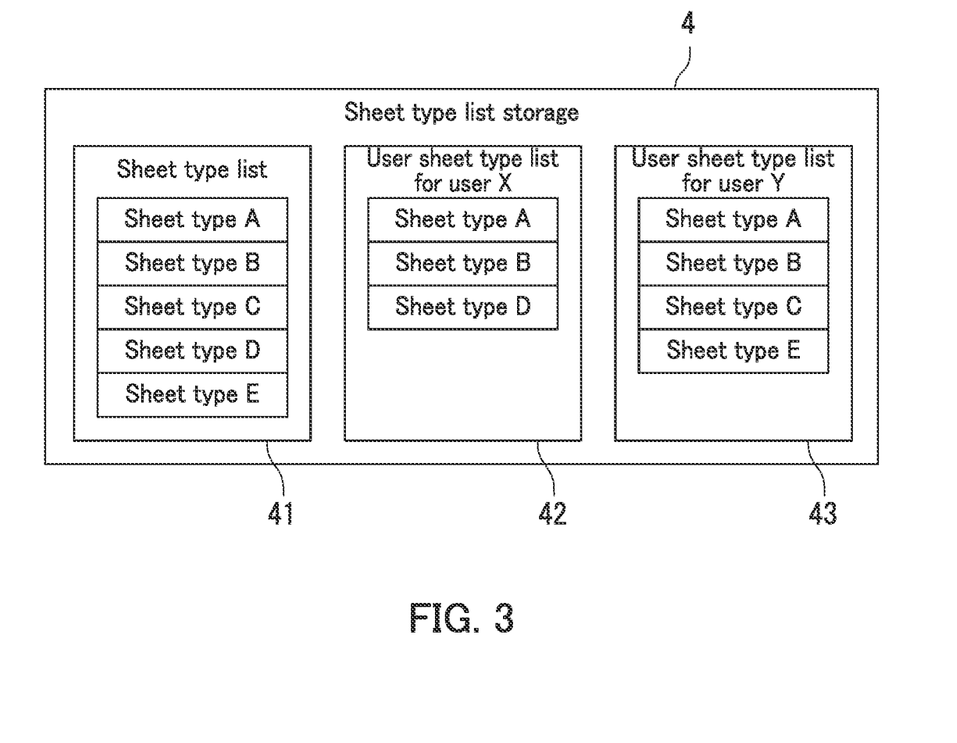
FIG. 3 is a diagram illustrating examples of sheet type lists stored in sheet type list storage in the embodiment.

FIG. 3 is a diagram illustrating an example of lists stored in the sheet type list storage 4 in the present embodiment. In the example illustrated in FIG. 3, the sheet type list storage 4 stores therein at least a user sheet type list 42 for a user X and a user sheet type list 43 for a user Y. Alternatively, the sheet type list storage 4 stores therein a sheet type list 41, the user sheet type list 42 for the user X, and the user sheet type list 43 for the user Y.

The sheet type list 41 is a list of sheets that the image forming section 2 is capable of coping with, that is, a list of types of sheets on which the image forming section is capable of forming a data image. The types of sheets include sheet types and sheet sizes. In the example illustrated in FIG. 3, the sheet type list 41 includes sheet types A to E. Examples of the sheet types in the sheet types A to E include plain sheet, recycled paper, thin paper, thick paper, coated paper, and an overhead projector (OHP) sheet. For specific example, the sheet type A may indicate A4-size plain paper and the sheet type B may indicate A3-size plain paper.

The user sheet type list 42 for the user X is a user sheet type list corresponding to the user X. The user sheet type list 42 for the user X includes the sheet types A, B, and D extracted from among the sheet types A to E included in the sheet type list 41. The user sheet type list 43 for the user Y is a user sheet type list corresponding to the user Y. The user sheet type list 43 for the user Y includes the sheet types A to C and E extracted from among the sheet types A to E included in the sheet type list 41.

Note that in a situation in which the authentication section 6 authenticates a new user (e.g., a user Z), a user sheet type list for the user Z is not yet stored in the sheet type list storage 4. Upon the authentication section 6 authenticating the new user Z in the above situation, the control unit 9 copies the sheet type list 41 and stores the copied sheet type list 41 in the sheet type list storage 4 as a user sheet type list for the user Z. That is, a user sheet type list in the initial state for the user Z contains the same contents as the sheet type list 41.

Alternatively, the user Z may be allowed to select generation or non-generation of a user sheet type list for the user Z exclusive for himself or herself. When the user Z instructs through the operation section 7 the control unit 9 to generate a user sheet type list, the control unit 9 generates a user sheet type list for the user Z by copying the sheet type list 41 in the manner described above. When the user Z instructs through the operation section 7 the control unit 9 not to generate a user sheet type list by contrast, the control unit 9 does not generate a user sheet type list for the user Z. In this case, the sheet type list 41 is used for the user Z.

The tray-sheet storage 5 in FIG. 1 stores therein the sheet types of the sheets 33, 34, and 38 loaded on the respective sheet feed trays 31, 32, and 37. For example, the tray-sheet storage 5 stores therein the sheet type A as the sheet type of the sheet 33 loaded on the first sheet feed tray 31, the sheet type B as the sheet type of the sheet 34 loaded on the second sheet feed tray 32, and the sheet type C as the sheet type of the sheet 38 loaded on the manual sheet feed tray 37. Note that the correspondence between the sheet feed trays and the sheet types are changeable as described later with reference to FIG. 4.

The authentication section 6 authenticates a user who is to use the image forming apparatus 1. For example, the authentication section 6 pre-stores therein user identification information for identifying each user. The authentication section 6 includes an integrated circuit (IC) card reader, and reads user identification information stored in an IC card that the user possesses. The authentication section 6 authenticates a user if the user identification information of the IC card of the user matches the pre-stored user identification information. Note that the authentication method is not limited to the above method.

The operation section 7 receives operation by a user authenticated by the authentication section 6. The operation section 7 includes a touch panel or a hard button, for example.

The display section 8 displays a screen generated by the display controller 10. The display section 8 includes a liquid-crystal display or an electroluminescent (EL) display, for example. Note that a touch panel constituting the operation section 7 may be integrated on the display surface of the display section 8.

The control unit 9 controls operation of each element of the image forming apparatus 1. The control unit 9 includes a display controller 10, a registration section 11, and an updating section 12. The control unit 9 includes a processor such as a central processing unit (CPU), and memory such as read only memory (ROM) or RAM, for example. The processor executes computer programs stored in the memory to implement the functions of the control unit 9 including the display controller 10, the registration section 11, and the updating section 12.

The display controller 10 generates a sheet type selection screen based on a user sheet type list for a user authenticated by the authentication section 6 that is stored in the sheet type list storage 4. For example, upon the authentication section 6 authenticating the user X, the display controller 10 acquires the user sheet type list 42 for the user X corresponding to the user X from the sheet type list storage 4. The display controller 10 generates a sheet type selection screen based on the sheet types A, B, and D included in the acquired user sheet type list 42 for the user X. The display controller 10 causes the display section 8 to display the generated sheet type selection screen.

Alternatively, the display controller 10 may generate a sheet type selection screen based on the sheet type list 41 stored in the sheet type list storage 4. The display controller 10 acquires the sheet type list 41 from the sheet type list storage 4. The display controller 10 generates a sheet type selection screen based on the sheet types A to E included in the acquired sheet type list 41. The display controller 10 causes the display section 8 to display the generated sheet type selection screen.

When sheet replacement or sheet replenishment for one of the sheet feed trays is performed, the registration section 11 registers in the tray-sheet storage 5 the sheet feed tray and a sheet type for which the operation section 7 has received selection in association with each other. For example, in a situation in which a user is to replenish the first sheet feed tray 31 with a sheet of the sheet type B as the sheet 33 or in a situation in which the user is to replace the sheet 33 on the first sheet feed tray 31, which is of the sheet type A, with a sheet of the sheet type B, the user operates the operation section 7 to specify the first sheet feed tray 31 for which sheet replenishment or sheet replacement is to be performed. Subsequently, the user selects from the sheet type list on the sheet type selection screen the sheet type B for a sheet be loaded as the sheet 33 on the first sheet feed tray 31 by operating the operation section 7. The registration section 11 registers in the tray-sheet storage 5 the sheet type B and the first sheet feed tray 31 selected by the user through the operation section 7 in association with each other.

The updating section 12 deletes a sheet type included in a user sheet type list stored in the sheet type list storage 4 once a non-use time during which no sheets of the sheet type have been used has exceeded a specific time. For example, the updating section 12 performs monitoring and determines when and which sheet type of a sheet is used by each user authenticated by the authentication section 6. When the user X does not use the sheet type A for a specific time among the sheet types A, B, and D included in the user sheet type list 42 for the user X, the updating section 12 deletes the sheet type A from the user sheet type list 42 for the user X.

Figure 4:
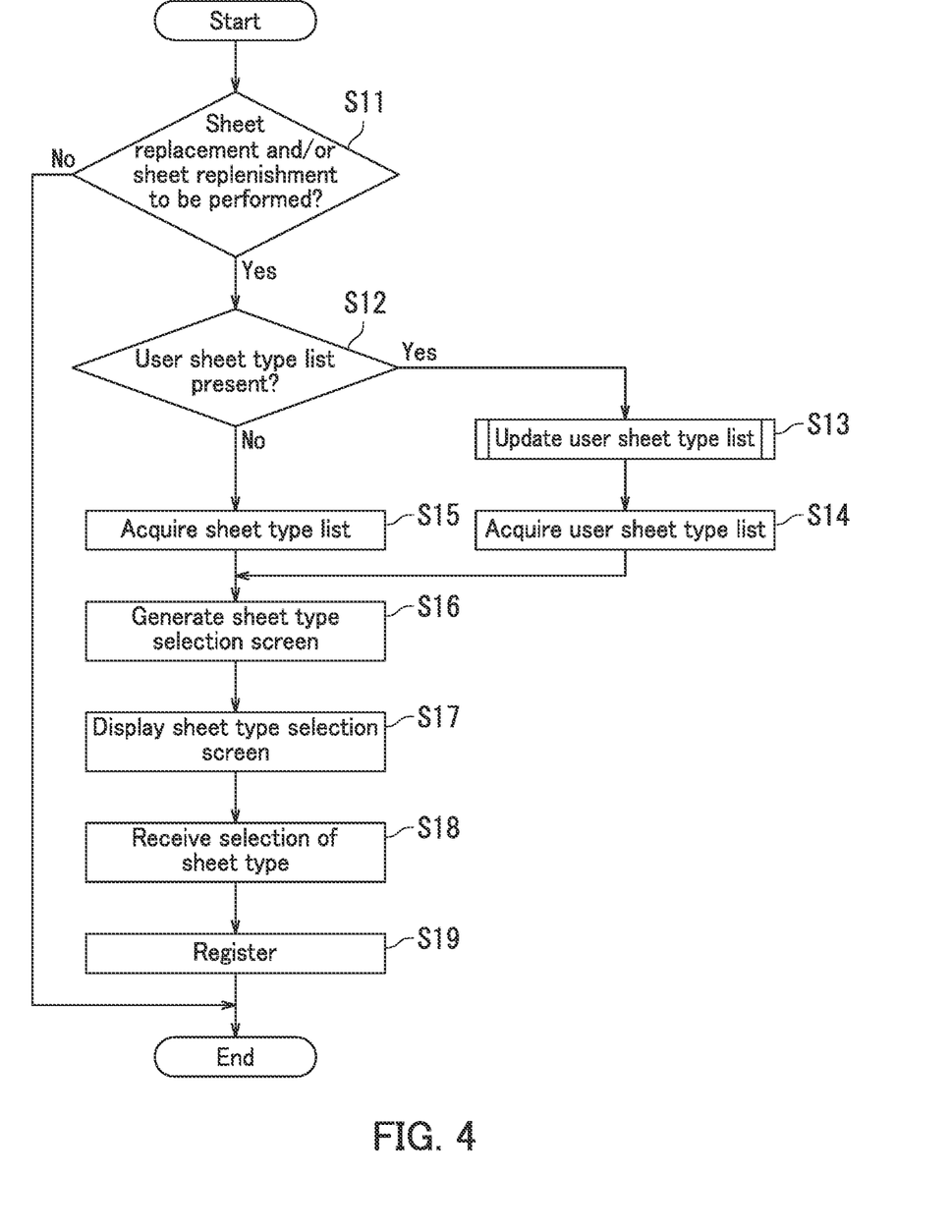
FIG. 4 is a flowchart depicting an operation example of sheet type registration performed by the image forming apparatus according to the embodiment.

An operation performed by the image forming apparatus 1 will be described next with reference to FIGS. 4 to 7. FIG. 4 is a flowchart depicting an example operation of sheet type registration performed by the image forming apparatus 1 according to the present embodiment. An operation for sheet type registration by the image forming apparatus 1 will be described here using an example case in which the user X authenticated by the authentication section 6 is about to replace the sheet 33 of the sheet type A on the first sheet feed tray 31 with a sheet of the sheet type B. Note that an operation similar to that for sheet replacement can be performed for sheet replenishment in the image forming apparatus 1.

In Step S11, the control unit 9 receives an instruction as to sheet replacement for the first sheet feed tray 31 from the user X through the operation section 7. If the instruction as to sheet replacement is received (Yes in Step S11), the routine of the image forming apparatus 1 proceeds to Step S12. In any other cases (No in Step S11), the routine of the image forming apparatus 1 ends.

In Step S12, the display controller 10 determines whether or not the user sheet type list 42 for the user X is present in the sheet type list storage 4. If the user sheet type list 42 for the user X is present in the sheet type list storage 4 (Yes in Step S12), the routine of the image forming apparatus 1 proceeds to Step S13.

In Step S13, the updating section 12 updates the user sheet type list 42 for the user X. The processing in Step S13 will be described later with reference to FIG. 6. Note that although sheet replacement or sheet replenishment triggers update of the user sheet type list 42 for the user X in the example illustrated in FIG. 4, the trigger is not limited to sheet replacement and sheet replenishment. For example, the updating section 12 may update the user sheet type list for each user stored in the sheet type list storage 4 each time a predetermined time elapses.

In Step S14, the display controller 10 acquires the user sheet type list 42 for the user X corresponding to the user X from the sheet type list storage 4.

When the user sheet type list 42 for the user X is not present in the sheet type list storage 4 (No in Step S12), the routine of the image forming apparatus 1 proceeds to Step S15. Note that that the user sheet type list 42 for the user X not being present means for example a case in which the user X has instructed the control unit 9 not to generate a user sheet type list exclusive to himself or herself as describe previously.

In Step S15, the display controller 10 acquires the sheet type list 41 from the sheet type list storage 4.

In Step S16, the display controller 10 generates a sheet type selection screen based on the user sheet type list 42 for the user X acquired in Step S14 or the sheet type list 41 acquired in Step S15.

In Step S17, the display section 8 displays the sheet type selection screen generated by the display controller 10.

Figure 5:
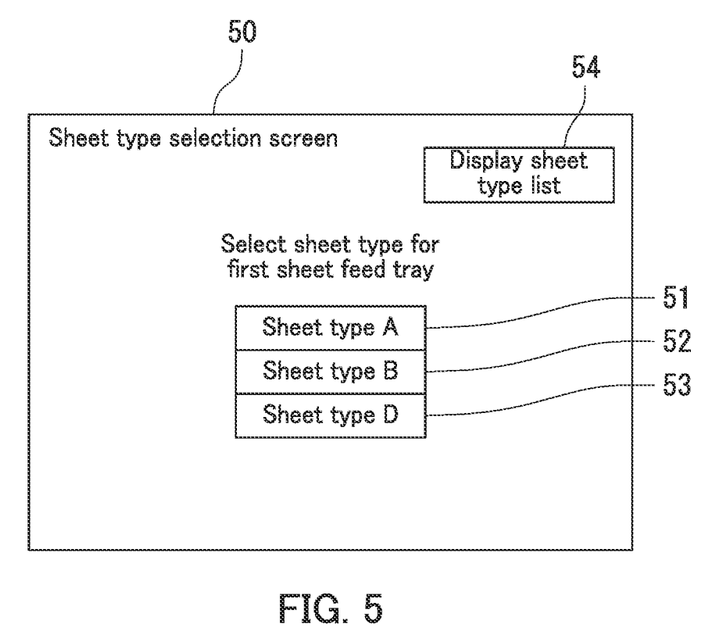
FIG. 5 is a diagram illustrating an example of a sheet type selection screen displayed in the image forming apparatus according to the embodiment.

FIG. 5 is a diagram illustrating an example of a sheet type selection screen 50 displayed in the image forming apparatus 1 according to the present embodiment. In the example illustrated in FIG. 5, the touch panel of the operation section 7 is integrated into the display of the display section 8.

The display controller 10 generates a sheet type selection screen 50 as illustrated in FIG. 5 based on information on the sheet types A, B, and D included in the user sheet type list 42 for the user X. A sheet type A button 51, a sheet type B button 52, and the sheet type D button 53 are displayed on the sheet type selection screen 50. In a case for example in which the sheet type A represents A4-size plain paper, "A4-size plain paper" may for example be displayed as a specific character string rather than "Sheet type A".

The sheet type selection screen 50 illustrated in FIG. 5 is a screen based on the user sheet type list 42 for the user X corresponding to the user X who is performing sheet replacement. As such, the buttons corresponding to the sheet types A, B, and D are displayed on the sheet type selection screen 50. In a case in which a user performing sheet replacement is the user Y, buttons (not illustrated) corresponding to the sheet types A, B, C, and E are displayed on the sheet type selection screen 50 based on the user sheet type list 43 for the user Y. When the sheet type list 41 is acquired in Step S15, buttons (not illustrated) corresponding to the sheet types A to E are displayed on the sheet type selection screen 50.

In Step S18 in FIG. 4, the operation section 7 receives selection of one of the sheet types displayed on the sheet type selection screen 50. For example, when the user X performs sheet type selection on the sheet type B button 52, the operation section 7 notifies the registration section 11 of selection of the sheet type B.

The sheet types A, B, and D, which are useful to the user X, are displayed on the sheet type selection screen 50 rather than all the sheet types A to E that the image forming section 2 is capable of coping with. In a case in which all the sheet types that the image forming section 2 is capable of coping with are to be displayed on the sheet type selection screen 50, not all of the sheet types may be displayed on a single screen. When it is impossible to display all the sheet types that the image forming section 2 is capable of coping with on a single screen, the user X has to perform scrolling for searching for a desired sheet type, which impairs accessibility and searchability. When only sheet types useful to the user X are selectively displayed on the sheet type selection screen 50 by contrast, operation for example for scrolling can be reduced. This accordingly increases accessibility and searchability. Furthermore, as a result of the number of sheet types displayed on the sheet type selection screen 50 being reduced, it is expected to reduce sheet type selection mistakes by the user.

In Step S19, the registration section 11 registers in the tray-sheet storage 5 the first sheet feed tray 31 for which sheet replacement is to be performed and the sheet type B received through the operation section 7 in association with each other.

Note that the display controller 10 may cause a sheet type list display button 54 to be displayed on the sheet type selection screen 50 as illustrated in FIG. 5. The sheet type list display button 54 is an image for allowing a user to select display or non-display of a screen displaying the sheet type list 41. Upon the sheet type list display button 54 being operated, the display controller 10 switches the screen currently displayed on the display section 8 from the sheet type selection screen 50 illustrated in FIG. 5 to a sheet type selection screen 60 illustrated in FIG. 6.

Figure 6:
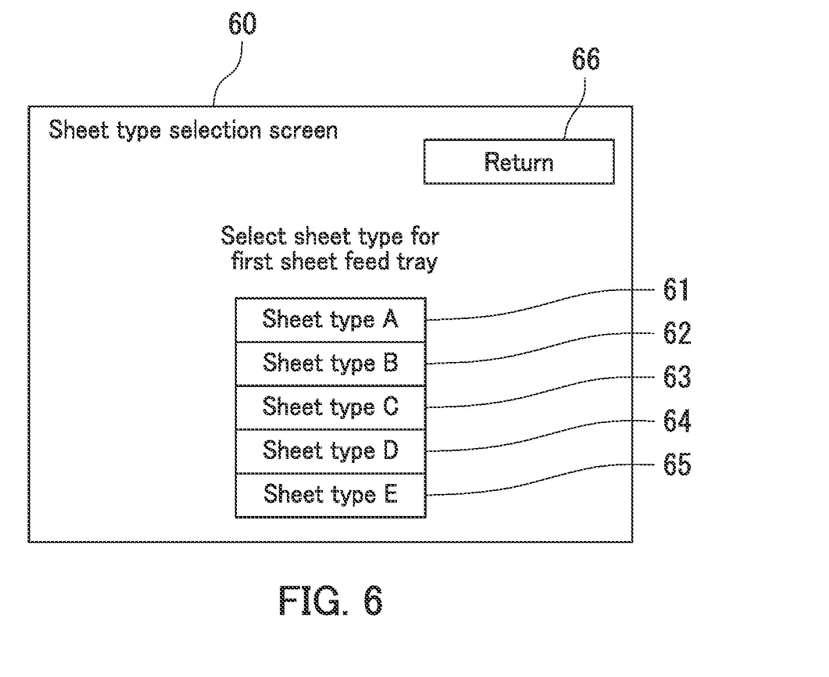
FIG. 6 is a diagram illustrating another example of the sheet type selection screen displayed in the image forming apparatus according to the embodiment.

FIG. 6 is a diagram illustrating another example (i.e., the sheet type selection screen 60) of the sheet type selection screen 50 displayed in the image forming apparatus 1 according to the present embodiment. For example, the user X desiring to select a sheet type other than the sheet types A, B, and D operates the sheet type list display button 54. Upon receiving operation on the sheet type list display button 54, the operation section 7 notifies the display controller 10 of the receipt. The display controller 10 generates the sheet type selection screen 60 on which the sheet type A button 61, the sheet type B button 62, the sheet type C button 63, the sheet type D button 64, and the sheet type E button 65 are displayed based on the sheet type list 41 stored in the sheet type list storage 4, and causes the display section 8 to display the generated sheet type selection screen 60. Additionally, the display controller 10 may cause display of a button 66 for returning to the sheet type selection screen 50 on the sheet type selection screen 60.

When the user X selects the sheet type E button 65 on the sheet type selection screen 60, the operation section 7 notifies the registration section 11 of the sheet type E being selected. The registration section 11 registers in the tray-sheet storage 5 the first sheet feed tray 31 for which sheet replacement is to be performed and the sheet type E received by the operation section 7 in association with each other. In the manner as described above, the user X is allowed to register any sheet type not included in the user sheet type list 42 for the user X excusive for himself or herself as a sheet type of a sheet to be loadable on the first sheet feed tray 31.

Furthermore, the operation section 7 may notify the updating section 12 of the sheet type E being selected. The updating section 12 updates the user sheet type list 42 for the user X stored in the sheet type list storage 4 by adding the sheet type E selected by the user X to the user sheet type list 42 for the user X in the sheet type list storage 4. The updated user sheet type list 42 for the user X includes the sheet types A, B, D, and E.

Figure 7:
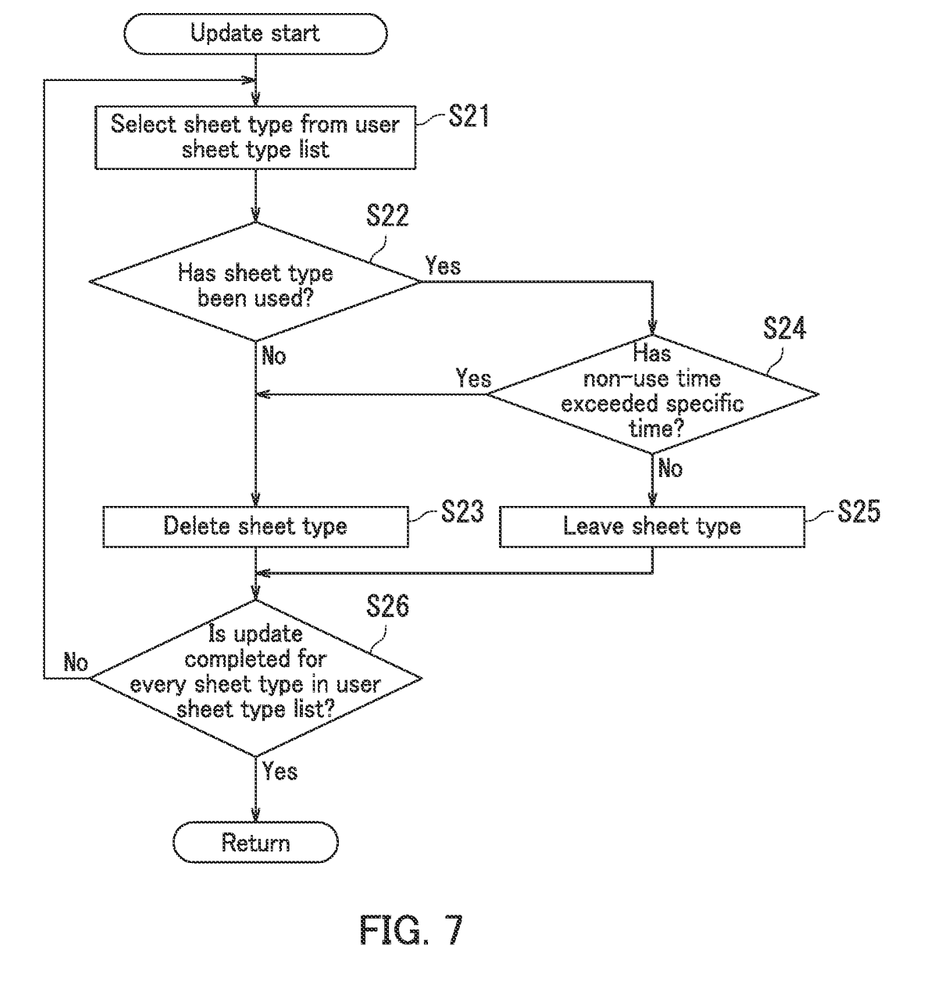
FIG. 7 is a detailed flowchart depicting an operation example of update in FIG. 4.

Processing in Step S13 in FIG. 4 will be described next in detail with reference to FIG. 7. FIG. 7 is a detailed flowchart depicting an example of update in FIG. 4. Similarly to the case in FIG. 4, the user X is also about to perform sheet replacement for the first sheet feed tray 31 in FIG. 7.

In Step S21, the updating section 12 selects one sheet type (e.g., the sheet type A) from the user sheet type list 42 for the user X corresponding to the user X.

In Step S22, the updating section 12 determines whether or not the user X has used in the past the sheet type A selected in Step S21.

For example, the control unit 9 stores in the sheet type list storage 4 a type of a sheet used when the user X has caused the image forming section 2 to perform image formation in association with the time and date of the use. Accordingly, the user sheet type list 42 for the user X includes a piece of information on the sheet type A and the last date and time when the sheet type A was used, a piece of information on the sheet type B and the last date and time when the sheet type B has been used, and a piece of information on the sheet type D and the last date and time when the sheet type D has been used. The updating section 12 performs determination in Step S22 based on the user sheet type list 42 for the user X as described above.

If the sheet type A has not been used by the user X (No in Step S22), the updating section 12 deletes the sheet type A from the user sheet type list 42 for the user X (Step S23). If the sheet type A has been used by the user X by contrast (Yes in Step S23), the routine of the image forming apparatus 1 proceeds to Step S24.

In Step S24, the updating section 12 determines whether or not a non-use time during which no sheets of the sheet type A have been used has exceeded a specific time. The specific time is preset in the updating section 12. Further, the specific time may be changeable by the user X operating the updating section 12 through the operation section 7. For example, assume that the user X sets a specific time exclusive to himself or herself to two weeks. The updating section 12 acquires the last date and time when the sheet type A has been used from the user sheet type list 42 for the user X, and determines whether or not two weeks has elapsed from the last date and time.

If the non-use time for which the sheet type A has not been used has exceeded the specific time (Yes in Step S24), the updating section 12 deletes the sheet type A from the user sheet type list 42 for the user X (Step S23). If the non-use time for which the sheet type A has not been used has not exceeded the specific time (No in step S24), the updating section 12 leaves the sheet type A in the user sheet type list 42 for the user X (Step S25). As a result, a sheet type useful to the user X remains in the user sheet type list 42 for the user X.

In Step S26, the updating section 12 determines whether or not the update in Steps S22 to S25 has been completed for every sheet type included in the user sheet type list 42 for the user X. At this time point, the update for only the sheet type A has been completed among the sheet types A, B, and D (No in Step S26). Accordingly, the routine of the image forming apparatus 1 returns to Step S21. In and after Step S21, the updating section 12 performs the update for the sheet types B and D for which the update has not been completed. Once the update for all the sheet types A, B, and D has been completed (Yes in Step S26), the routine of the image forming apparatus 1 proceeds to Step S14 in FIG. 4.

As has been described so far with reference to FIGS. 1 to 7, the image forming apparatus 1 includes an image forming section 2, sheet type list storage 4, an authentication section 6, a display controller 10, and a display section 8. The image forming section 2 forms a data image on a sheet. The sheet type list storage 4 stores user sheet type lists (e.g., the user sheet type list 42 for the user X and the user sheet type list 43 for the user Y in FIG. 3) therein on a user-by-user basis. The user sheet type lists each include one or more sheet types extracted from among sheet types included in a sheet type list (e.g., the sheet type list 41 in FIG. 3). The sheet types are sheet types that the image forming section 2 is capable of coping with. The authentication section 6 authenticates a user. The display controller 10 generates a sheet type selection screen 50 based on a user sheet type list corresponding to the user authenticated by the authentication section 6 among the user sheet type lists stored in the sheet type list storage 4. The display section 8 displays the sheet type selection screen 50 generated by the display controller 10. The sheet type selection screen 50 displays a sheet type useful to the user X rather than all the sheet types that the image forming section 2 is capable of coping with. In the above configuration, the image forming apparatus 1 can provide favorable accessibility and searchability for sheet information to the users.

In the image forming apparatus 1, the sheet type selection screen displays the one or more sheet types included in the user sheet type list corresponding to the user authenticated by the authentication section. The image forming apparatus 1 further includes a sheet feed tray on which the sheet is to be loaded, an operation section 7, tray-sheet storage 5, and a registration section 11. The operation section 7 receives selection of one sheet type of the one or more sheet types displayed on the sheet type selection screen 50. The selection is performed by the user authenticated by the authentication section 6. The tray-sheet storage 5 stores therein a correspondence between the sheet feed tray and a sheet type of the sheet types. When at least one of sheet replacement and sheet replenishment for the sheet feed tray is performed, the registration section 11 registers the sheet feed tray and the one sheet type selected through the operation section 7 in association with each other in the tray-sheet storage 5. In the above configuration, the image forming apparatus 1 can provide favorable accessibility and searchability for the sheet information when the user associates a sheet feed tray with a sheet type.

The sheet type list storage 4 stores therein the sheet type list (e.g., the sheet type list 41 in FIG. 3) including the sheet types that image forming section 2 is capable of coping with in addition to the user sheet type lists. The display controller 10 adds to the sheet type selection screen 50 an image (e.g., the sheet type list display button 54 in FIG. 5) for allowing the user to select display or non-display of a screen (e.g., the sheet type selection screen 60 in FIG. 6) displaying the sheet type list stored in the sheet type list storage 4. Upon the operation section 7 receiving operation on the added image, the display controller 10 switches a display screen currently displayed on the display section 8 from the sheet type selection screen 50 to the screen displaying the sheet type list. In the above configuration, the user is allowed to select a desired sheet type through the sheet type selection screen 60 displaying the sheet types included in the sheet type list 41 in a situation in which the sheet type selection screen 50 displaying the sheet types included in the sheet type list exclusive to himself or herself does not display the desired sheet type.

The image forming apparatus 1 further includes an updating section 12. The updating section 12 updates the user sheet type list corresponding to the user authenticated by the authentication section 6 by deleting from the user sheet type list corresponding to the user each of the one or afore sheet types included in the user sheet type list corresponding to the user and stored in the sheet type list storage once a non-use time during which no sheets of the sheet type have been used has exceeded a specific time. The specific sheet type is included in the user sheet type list corresponding to the user and stored in the sheet type list storage. In a configuration in which the image forming apparatus 1 automatically updates the user sheet type list as described above, the user does not have to check whether or not each sheet type is useful to himself or herself.

When the user authenticated by the authentication section 6 performs at least one of sheet replacement and sheet replenishment for the sheet feed tray, the updating section 12 updates the user sheet type list corresponding to the user. In the above configuration, the display controller 10 generates the sheet type selection screen 50 based on the latest user sheet type list corresponding to the user and causes the display section 8 to display the generated sheet type selection screen 50.

An embodiment has been described so far with reference to the drawings (FIGS. 1 to 7). However, the present disclosure is not limited to the above embodiment and can be practiced in various manners within a scope not departing from the gist of the present disclosure. Furthermore, the drawings schematically illustrate elements of configuration in order to facilitate understanding. Properties such as thickness and length, and the number of each element of configuration illustrated in the drawings may differ from actual properties and the number thereof in order to facilitate preparation of the drawings.

What is claimed is:

1. An image forming apparatus comprising:
   an image forming section configured to form a data image on a sheet;
   a sheet type list storage that stores user sheet type lists therein on a user-by-user basis, the user sheet type lists each including one or more sheet types extracted from among sheet types included in a sheet type list, the sheet types being sheet types that the image forming section is capable of coping with;
   an authentication section configured to authenticate a user;
   a display controller configured to generate a sheet type selection screen based on a user sheet type list corresponding to the user authenticated by the authentication section among the user sheet type lists stored in the sheet type list storage;
   a display section configured to display the sheet type selection screen generated by the display controller;
   a sheet feed tray on which the sheet is to be loaded;
   an operation section configured to receive selection of one sheet type of the one or more sheet types displayed on the sheet type selection screen, the selection being performed by the user authenticated by the authentication section;
   tray-sheet storage that stores therein a correspondence between the sheet feed tray and a sheet type of the sheet types; and
   a registration section configured to register, when at least one of sheet replacement and sheet replenishment for the sheet feed tray is performed, the sheet feed tray and the one sheet type selected through the operation section in association with each other in the tray-sheet storage.

2. The image forming apparatus according to claim 1, wherein
   the sheet type list storage stores therein the sheet type list including the sheet types that the image forming section is capable of coping with in addition to the user sheet type lists,
   the display controller adds to the sheet type selection screen an image for allowing the user to select display or non-display of a screen displaying the sheet type list stored in the sheet type list storage, and
   upon the operation section receiving operation on the image, the display controller switches a display screen currently displayed on the display section from the sheet type selection screen to the screen displaying the sheet type list.

3. The image forming apparatus according to claim 1, further comprising
   an updating section configured to update the user sheet type list corresponding to the user authenticated by the authentication section by deleting from the user sheet type list corresponding to the user each of the one or more sheet types included in the user sheet type list corresponding to the user and stored in the sheet type list storage once a non-use time during which no sheets of the sheet type have been used has exceeded a specific time.

4. The image forming apparatus according to claim 3, wherein
   when the user authenticated by the authentication section performs at least one of sheet replacement and sheet replenishment for the sheet feed tray, the updating section updates the user sheet type list corresponding to the user.

5. An image forming apparatus comprising:

an image forming section configured to form a data image on a sheet;

a sheet type list storage that stores user sheet type lists therein on a user-by-user basis, the user sheet type lists each including one or more sheet types extracted from among sheet types included in a sheet type list, the sheet types being sheet types that the image forming section is capable of coping with;

an authentication section configured to authenticate a user;

a display controller configured to generate a sheet type selection screen based on a user sheet type list corresponding to the user authenticated by the authentication section among the user sheet type lists stored in the sheet type list storage;

a display section configured to display the sheet type selection screen generated by the display controller; and an updating section configured to update the user sheet type list corresponding to the user authenticated by the authentication section by deleting from the user sheet type list corresponding to the user each of the one or more sheet types included in the user sheet type list corresponding to the user and stored in the sheet type list storage once a non-use time during which no sheets of the sheet type have been used has exceeded a specific time.

6. The image forming apparatus according to claim 5, further comprising a sheet feed tray, wherein when the user authenticated by the authentication section performs at least one of sheet replacement and sheet replenishment for the sheet feed tray, the updating section updates the user sheet type list corresponding to the user.

* * * * *